(12) United States Patent
Diamond (10) Patent No.: US 8,025,860 B1
(45) Date of Patent: Sep. 27, 2011

(54) REMOVAL OF ACID MISTS

(75) Inventor: Barry Wayne Diamond, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 12/832,130

(22) Filed: Jul. 8, 2010

(51) Int. Cl.
*B01D 53/50* (2006.01)
*B01D 53/56* (2006.01)
*B01D 53/74* (2006.01)

(52) U.S. Cl. ............ 423/210; 423/242.1; 423/235; 422/168; 422/261; 55/421; 55/423; 95/39; 95/116; 95/129; 95/128; 95/137; 95/232; 95/235; 96/189

(58) Field of Classification Search ............ 423/210, 423/242.1, 235; 422/168, 261; 55/421, 423; 95/39, 116, 129, 128, 137, 232, 235; 96/189
See application file for complete search history.

(56) References Cited

U.S. PATENT DOCUMENTS

| | | | |
|---|---|---|---|
| 2,369,020 A * | 2/1945 | Clark | ............ 96/389 |
| 3,432,263 A | 3/1969 | Ohsol | |
| 3,540,190 A | 11/1970 | Brink, Jr. | |
| 3,948,624 A | 4/1976 | Fornoff et al. | |
| 4,348,373 A | 9/1982 | Schoubye | |
| 4,818,257 A | 4/1989 | Kennedy et al. | |
| 5,139,544 A | 8/1992 | Lucero et al. | |
| 5,198,206 A | 3/1993 | Schoubye | |
| 7,416,716 B2 | 8/2008 | Allam et al. | |
| 2007/0122328 A1 | 5/2007 | Allam et al. | |
| 2008/0173584 A1 | 7/2008 | White et al. | |
| 2008/0173585 A1 | 7/2008 | White et al. | |
| 2008/0176174 A1 | 7/2008 | White et al. | |

OTHER PUBLICATIONS

Dillon, et at; "Oxy-Combustion Processes for CO2 Capture from Advanced Supercritical PF and NGCC Power Plant;" presented at GHGT-7 Vancouver, Sep. 2004.
Jordal; et al; "Oxyfuel Combustion for Coal-Fired Power Generation with CO2 Capture-Opportunities and Challenges;" GHGT-7 Vancouver, 2004.
Topsoe Technologies; "The Topsoe SNOX technology for cleaning flue gas from combustion of petroleum coke and high sulfur petroleum residues;" produced by Haldor Topsoe A/S' (revised May 2006).
Fujishima et al; "Experiences of Wet Type Electrostatic Precipitator Successfully Applied for SO3 Mist Removal in Boilers Using High Sulfur Content Fuel" ICESP IX Conference, South Africa; May 17-21, 2004.
ACS Industries; "The Engineered Mist Eliminator;" brochure Houston, TX; 2004.
Wilkinson, et al; "Oxyfuel Conversion of Heaters and Boilers for CO2 Capture;" Second National Conference on Carbon Sequestration; Washington DC; May 5-8, 2003.
Petrocelli, et al; U.S. Appl. No. 12/832,096, filed Jul. 8, 2010; "Integration of Catalytic CO2 Oxidation and Oxyfuel Sour Compression."
Petrocelli, et al; U.S. Appl. No. 12/832,204, filed Jul. 8, 2010; "Sorbent Use with Oxyfuel Sour Compression."
White et al; U.S. Appl. No. 12/832,095, filed Jul. 8, 2010; "Handling of Acids from Compressed Oxyfuel-Derived CO2."
Wright, et al; U.S. Appl. No. 12/832,156, filed Jul. 8, 2010; Treatment of Flue Gas from an Oxyfuel Combustion Process.
Wright, et al; U.S. Appl. No. 12/832,117, filed Jul. 8, 2010; "Recycle TSA Regen Gas to Boiler for Oxyfuel Operations."

* cited by examiner

*Primary Examiner* — Timothy Vanoy
(74) *Attorney, Agent, or Firm* — Willard Jones, II (57) ABSTRACT

Acid mist may be removed efficiently from a gas stream using at least one fiber bed mist eliminator operating at elevated pressure of typically at least 2 bar (0.2 MPa), e.g. at about 4 bar (0.4 MPa) to about 50 bar (5 MPa). The invention has particular application in methods for processing carbon dioxide flue gas in which $SO_2$ and/or $NO_x$ contaminants are converted at elevated pressure to sulfuric acid condensate and/or nitric acid condensate respectively.

15 Claims, 1 Drawing Sheet

FIG. 1

REMOVAL OF ACID MISTS

BACKGROUND OF THE INVENTION

The present invention relates generally to a method for removing acid mist from a gas stream. In particular, the invention relates to the purification of carbon dioxide by removing acid mist. The present invention has particular application in the purification of flue gas containing $SO_x$ and $NO_x$ generated by oxyfuel combustion of a fuel selected from hydrocarbon fuels and carbonaceous fuels, in which sulfur dioxide ($SO_2$) and $NO_x$ are converted to at least sulfuric acid condensate and nitric acid condensate respectively.

The term "$SO_x$" means oxides of sulfur and includes $SO_2$ and sulfur trioxide ($SO_3$). The term "$NO_x$" means oxides of nitrogen and includes primarily nitric oxide (NO) and nitrogen dioxide ($NO_2$). $NO_x$ may comprise one or more other oxides of nitrogen including $N_2O$, $N_2O_4$ and $N_2O_3$.

It has been asserted that one of the main causes of global warming is the rise in greenhouse gas contamination in the atmosphere due to anthropological effects. The main greenhouse gas which is being emitted, carbon dioxide ($CO_2$), has risen in concentration in the atmosphere from 270 ppm before the industrial revolution to the current figure of about 378 ppm. Further rises in $CO_2$ concentration are inevitable until $CO_2$ emissions are curbed. The main sources of $CO_2$ emission are fossil fuel fired electric power stations and from petroleum fuelled vehicles.

The use of fossil fuels is necessary in order to continue to produce the quantities of electric power that nations require to sustain their economies and lifestyles. There is, therefore, a need to devise efficient means by which $CO_2$ may be captured from power stations burning fossil fuel so that it can be stored rather than being vented into the atmosphere. Storage may be deep undersea; in a geological formation such as a saline aquifer; or a depleted oil or natural gas formation. Alternatively, the $CO_2$ could be used for enhanced oil recovery (EOR).

The oxyfuel combustion process seeks to mitigate the harmful effects of $CO_2$ emissions by producing a net combustion product gas consisting of $CO_2$ and water vapor by combusting a carbonaceous or hydrocarbon fuel in pure oxygen. This process would result in an absence of nitrogen ($N_2$) in the flue gas, together with a very high combustion temperature which would not be practical in a furnace or boiler. In order to moderate the combustion temperature, part of the total flue gas stream is typically recycled, usually after cooling, back to the burner.

An oxyfuel process for $CO_2$ capture from a pulverized coal-fired power boiler is described in a paper entitled "*Oxy-combustion processes for $CO_2$ capture from advanced supercritical PF and NGCC power plants*" (Dillon et al; presented at GHGT-7, Vancouver, Sep. 2004), the disclosure of which is incorporated herein by reference.

Oxyfuel combustion produces raw flue gas containing primarily $CO_2$, together with contaminants such as water vapor; "non-condensable" gases, i.e. gases from chemical processes which are not easily condensed by cooling, such as excess combustion oxygen ($O_2$), and/or $O_2$, $N_2$ and argon (Ar) derived from any air leakage into the system; and acid gases such as $SO_3$, $SO_2$, hydrogen chloride (HCl), NO and $NO_2$ produced as oxidation products from components in the fuel or by combination of $N_2$ and $O_2$ at high temperature. The precise concentrations of the gaseous impurities present in the flue gas depend on factors such as on the fuel composition; the level of $N_2$ in the combustor; the combustion temperature; and the design of the burner and furnace.

In general, the final, purified, $CO_2$ product should ideally be produced as a high pressure fluid stream for delivery into a pipeline for transportation to storage or to site of use, e.g. in EOR. The $CO_2$ must be dry to avoid corrosion of, for example, a carbon steel pipeline. The $CO_2$ impurity levels must not jeopardize the integrity of the geological storage site, particularly if the $CO_2$ is to be used for EOR, and the transportation and storage must not infringe international and national treaties and regulations governing the transport and disposal of gas streams.

It is, therefore, necessary to purify the raw flue gas from the boiler or furnace to remove water vapor; $SO_x$; $NO_x$; soluble gaseous impurities such as HCl; and "non-condensable" gases such as $O_2$, $N_2$ and Ar, in order to produce a final $CO_2$ product which will be suitable for storage or use.

In general, the prior art in the area of $CO_2$ capture using the oxyfuel process has up to now concentrated on removal of $SO_x$ and $NO_x$ upstream of the $CO_2$ compression train in a $CO_2$ recovery and purification system, using current state of the art technology. $SO_x$ and $NO_x$ removal is based on flue gas desulphurization (FGD) schemes such as scrubbing with limestone slurry followed by air oxidation producing gypsum, and $NO_x$ reduction using a variety of techniques such as low $NO_x$ burners, over firing or using reducing agents such as ammonia or urea at elevated temperature with or without catalysts. Conventional $SO_x/NO_x$ removal using desulphurization and $NO_x$ reduction technologies is disclosed in "*Oxyfuel Combustion For Coal-Fired Power Generation With $CO_2$ Capture—Opportunities And Challenges*" (Jordal et al; GHGT-7, Vancouver, 2004). Such process could be applied to conventional coal boilers.

US 2007/0122328 A1 (granted as U.S. Pat. No. 7,416,716 B1) discloses the first known method of removing $SO_2$ and $NO_x$ from crude carbon dioxide gas produced by oxyfuel combustion of a hydrocarbon or carbonaceous fuel, in which the removal steps take place in the $CO_2$ compression train of a $CO_2$ recovery and purification system. This process is known as a "sour compression" process since acid gases are compressed with carbon dioxide flue gas. The method comprises maintaining the crude carbon dioxide gas at elevated pressure(s) in the presence of $O_2$ and water and, when $SO_2$ is to be removed, $NO_x$, for a sufficient time to convert $SO_2$ to sulfuric acid and/or $NO_x$ to nitric acid; and separating said sulfuric acid and/or nitric acid from the crude carbon dioxide gas.

It is well known that producing sulfuric acid and/or nitric acid using a condensation process can result in the formation of "acid mist" which is an aerosol of liquid acid condensate. In the context of the present invention, the term "aerosol" refers to a suspension of fine liquid droplets within a gas. The size of liquid droplets in an acid aerosol or mist such as a sulfuric acid mist may range from about 0.05 microns to about 10 microns (μm).

Acid mists must be removed efficiently from vent streams in order to meet stringent environmental emission regulations. In this connection, the maximum allowable emission into the atmosphere of sulfuric acid mist from sulfuric acid plants in the US is 0.15 lb (68 g) acid mist/ton 100% sulfuric acid produced, which works out to about 11 ppmv as an emission concentration. This maximum is similar to the European requirements. In addition, acid mists are highly corrosive and will damage downstream processing equipment if not removed to an adequate extent. Therefore, there is a need to reduce or eliminate acid mists in effluent gas from processes that form sulfuric acid and/or nitric acid condensates.

There is a problem, however, in that acid mists in general, and droplets of acid condensate having a mean average particle size of less than about 3 µm in particular, have proven to be very difficult to remove from gas streams.

Fiber bed mist eliminators have been used in the sulfuric acid industry to capture sulfuric acid mist prior to venting waste gas. Examples of the use of fiber bed mist eliminators in this way are disclosed in U.S. Pat. No. 3,540,190 A, U.S. Pat. No. 3,948,624 A, U.S. Pat. No. 4,348,373 A, U.S. Pat. No. 4,818,257 A and U.S. Pat. No. 5,139,544. In each case, the feed gas containing the acid mist is fed to the fiber bed mist eliminator(s) at about atmospheric pressure.

The Inventor is not aware of any industry that uses of fiber bed mist eliminators at elevated pressures.

U.S. Pat. No. 3,432,263 A discloses a process to produce sulfuric acid operating at an elevated pressure from about 5 bar to about 50 bar (0.5 MPa to 5 MPa) in which elemental sulfur is combusted in an oxyfuel combustion unit to produce $SO_2$ which is in turn is oxidized catalytically to form $SO_3$. The $SO_3$ is then absorbed in water at a temperature from about 50° C. to about 200° C. to produce a concentrated aqueous sulfuric acid solution. Residual gas is heated, expanded and then vented to the atmosphere. The reference is, however, entirely silent on the issue of acid mist production and subsequent removal from the residual gas.

Since the amount of acid mist produced for a given volume of gas in flue gas desulfurization (FGD) processes is much less than in sulfuric acid processes, the focus to date in FGD processes has been primarily on preventing acid mists from forming in the first place rather than on removing acid mists that may have been formed. For example, U.S. Pat. No. 5,198,206 in the name of Haldor Topsøe A/S of Denmark discloses a process in which emission of sulfuric acid mist is maintained below 5 ppmv by "heterogeneous nucleation control" which involves the addition of a specific amount of smoke or aerosol of solid particles to a flow of gas containing $SO_3$ and water upstream of a cooling tower or condenser. The solid particles may be produced by combusting hydrocarbons with more than 2 carbon atoms or silicones, or may be added as smoke from electric arc or welding. The solid particles act as minute nucleation cores that promote condensation of sulfuric acid. Indeed, according to promotional literature entitled "*The Topsøe SNOX™ technology for cleaning flue gas from combustion of petroleum coke and high sulfur petroleum residues*" (revised May 2006) produced by Haldor Topsøe A/S, formation of aerosol in the condenser is avoided by heterogeneous nucleation control. U.S. Pat. No. 4,348,373, also to Haldor Topsøe, discloses an alternative process for reducing acid mist formation that involves carefully controlling the temperature of an acid recycle stream in a sulfuric acid tower. Both of these processes operate at about atmospheric pressure.

The problem of sulfuric acid mist formation in FGD processes operating at about atmospheric pressure in power generation applications has also been addressed using wet electrostatic precipitators (WESPs) which are particulate collection devices that remove particles from a gas flow using an induced electrostatic charge. Processes involving the use of WESPs in this way are disclosed in JP 2009/195860 A and in "*Experiences of wet type electrostatic precipitator successfully applied for $SO_3$ mist removal in boilers using high sulfur content fuel*" (Fujishima and Nagata; Mitsubishi Heavy Industries, Ltd.; ICESP IX conference; South Africa; May 17-21; 2004).

Mesh pads have been suggested for use to capture acid mists in an HCl scrubber operating at 122 psia (8.4 bar) and 82° F. (28° C.) (Case Study #1; "*The Engineered Mist Eliminator*" brochure; ACS Industries Inc., Houston, Tex. 77053, USA; 2004). However, whilst mesh pads are reasonably efficient at removing droplets in acid mists at elevated pressures having a mean diameter of more than about 5 µm, their use in elevated pressure applications is limited since they are not suited for removing droplets in acid mists having a mean diameter of less than about 5 µm. In this connection, mesh pads demonstrate good removal of about 99% of mist at a droplet size of 5 µm or above. However, the "d50" value for this type of mist eliminator is about 2.5 µm, i.e. only 50% removal is expected at the 2.5 µm droplet size which is where most of the acid mist droplet size is expected.

There is a need to develop new methods for the efficient removal of acid mists from streams of gas such as carbon dioxide at elevated pressure, particularly from crude carbon dioxide gas such as flue gas produced in an oxyfuel combustion process. The new methods should remove at least substantially all, and preferably all, of the acid mist. In addition, the new methods should be able to remove effectively droplets of an acid mist in an aerosol that have a mean diameter of less than about 5 µm. The methods should ideally also be less complicated and less expensive, both in terms of the capital and operating cost, than existing technologies.

In particular, it is an object of preferred embodiments of the present invention to improve the methods disclosed in US 2007/0122328 A1 by providing an effective means by which acid mist may be removed from the carbon dioxide gas at elevated pressure.

BRIEF SUMMARY OF THE INVENTION

According to a first aspect of the present invention, there is provided a method for removing acid mist from a gas stream, said method comprising passing said gas stream through at least one fiber bed mist eliminator to produce coalesced acid condensate and a gas stream that is at least substantially free of acid mist, wherein said gas stream is fed to said fiber bed mist eliminator(s) at an elevated pressure.

The present method has particular application in removing acid mist from carbon dioxide gas in processes that remove $SO_2$ and/or $NO_x$ from flue gas generated by oxyfuel combustion process of a hydrocarbon or carbonaceous fuel, in which $SO_2$ is converted to sulfuric acid condensate and $NO_x$ is converted to nitric acid condensate.

The present method removes acid mists from streams of gas such as carbon dioxide, at elevated pressure. In particular, the present method removes effectively and efficiently droplets in an acid mist or aerosol that have a mean diameter of less than about 5 µm. In addition, the present method is less complicated and less expensive, both in terms of the capital and operating cost, than existing technologies. Further, the present method may be incorporated without difficulty into the method disclosed in US 2007/0122328 A1.

According to a second aspect of the present invention, there is provided apparatus for removing acid mist from a gas stream, said apparatus comprising:
a pressurizable vessel suitable for operating at an elevated pressure, said vessel comprising an interior divided into a first zone and a second zone by a partition wall; a gas inlet to said first zone, and a gas outlet from said second zone;
at least one fiber bed mist eliminator mounted on said partition wall providing a gas flow path from said first zone to said second zone; and
a liquid outlet for removing coalesced acid condensate from said second zone.

DETAILED DESCRIPTION OF THE INVENTION

The method comprises passing a gas stream containing an acid mist through at least one fiber bed mist eliminator to produce coalesced acid condensate and a gas stream that is at least substantially free of acid mist. The gas stream is fed to the fiber bed mist eliminator(s) at an elevated pressure.

In preferred embodiments, the method comprises converting $SO_2$ and/or $NO_x$ contaminants in a carbon dioxide feed gas to at least one inorganic acid derivative thereof to produce a stream of contaminant(s)-depleted carbon dioxide gas and the inorganic acid derivative(s) as an acid condensate; a part of the acid condensate being suspended in the contaminant(s)-depleted carbon dioxide gas as an acid mist. These preferred embodiments also comprises separating at least a portion of the acid condensate that is not suspended as acid mist from the stream of contaminant(s)-depleted carbon dioxide gas; and removing the acid mist from the stream of contaminant(s)-depleted carbon dioxide gas by passing the stream at elevated pressure through at least one fiber bed mist eliminator to produce coalesced acid condensate and a stream of contaminant(s)-depleted carbon dioxide gas that is at least substantially free of the acid mist.

Without wishing to be bound by any particular theory, the Inventor believes that a fiber bed mist eliminator collects acid mist using three mechanisms.

First, particles larger than about 3 µm are collected when their momentum prevents them from following gas stream lines around the fibers. Rather than following the stream lines around a fiber, these larger particles break out of the stream lines, strike the fiber and are thereby collected by the fiber. This mechanism is known as "inertial impaction".

Secondly, particles having a mean diameter from about 1 µm to about 3 µm tend to follow gas stream lines as they flow past a fiber. Any of these intermediate-sized particles passing within about a radius length of a fiber tend to be intercepted by the fiber. For example, a 1 µm particle passing within 0.5 µm of a fiber will be collected by the fiber. This mechanism is known as "direct interception".

Finally, fine particles having a mean diameter of less than about 1 µm have random side-to-side motion caused by collisions with gas molecules. For example, a 0.1 µm particle will have about 10 times random motion of a 1 µm particle, greatly increasing the probably of a collision with a fiber. This mechanism is referred to as "Brownian motion" or "Brownian diffusion".

The major separation mechanism used for mist droplets of less than about 1 µm in diameter is Brownian motion (as described above). Fiber bed filter performance for larger particles is enhanced by increasing gas flow rate or gas velocity. Thus, for impaction and interception mechanisms, increasing gas velocity has a beneficial impact on collection efficiency. This is due to the fact that higher velocity enhances the probability of capture by increasing the potential for collision or contact between fiber and droplet.

The Inventor has appreciated, however, that operating the fiber bed mist eliminator at elevated pressure reduces the actual gas flow rate, thereby providing a lower superficial gas velocity. Whilst a lower flow rate may have an adverse effect on the impaction and interception mechanisms, it unexpectedly has a positive impact on the efficiency of diffusion (Brownian motion) fiber bed elements by providing a more optimum (i.e. lower) velocity for separation by random molecular movement.

The Inventor believes that, for collection by Brownian motion to work, a relatively "quiescient" zone is needed to enhance the random particle motion. This is where the higher pressure operation is a benefit as higher pressure operation results in lower actual velocity. Process gas velocity is proportional to the density of the gas and liquid phases in accordance with the following relationship:

$$V\alpha(\rho_L-\rho_G)/\rho_G$$

where "V" is velocity; "$\rho_L$" is the density of the liquid phase; and "$\rho_G$" is the density of the gas phase. By way of example, liquid density for 20% sulfuric acid in water at 35° C. is 1,500 kg/m$^3$; gas density for 80% carbon dioxide with balance $N_2$, $O_2$ and Ar at 1 bar (0.1 MPa) is 1.6 kg/m$^3$; and gas density for 80% carbon dioxide with balance $N_2$, $O_2$ and Ar at 30 bar (3 MPa) is 56 kg/m$^3$. In this example, V$\alpha$937 for 1 bar (0.1 MPa) and V$\alpha$26 for 30 bar (3 MPa). This is a ratio of 36 times lower velocity due to the elevated pressure which would be expected to result in improved performance for the same size of equipment and/or smaller equipment area requirements for the same process gas flow (in the Brownian motion regime).

The term "elevated pressure" is intended to mean a pressure that is significantly higher than atmospheric pressure. For example, the term is intended to exclude minor elevations in pressure over atmospheric pressure, such as those elevations provided by a blower or fan in order to force a gas through apparatus operating at about atmospheric pressure. Such minor pressure elevations are considered to be insignificant in the context of the present invention.

The elevated pressure may be at least 2 bar (0.2 MPa), e.g. at least 3 bar (0.3 MPa), or at least 5 bar (0.5 MPa). The elevated pressure is usually no more than 100 bar (10 MPa), and preferably no more than 50 bar (5 MPa). In preferred embodiments, the elevated pressure is from about 4 bar to about 50 bar (0.4 MPa to 5 MPa).

The present invention may be applied in particular to methods for removing both $SO_2$ and $NO_x$ from a carbon dioxide feed gas comprising these components as contaminants in which $SO_2$ is converted to at least sulfuric acid condensate and, optionally, $NO_x$ is converted to at least nitric acid condensate. The invention has particular application in methods for removing $SO_2$ and $NO_x$ in this way from carbon dioxide feed gas that is, or is derived from, flue gas generated by oxyfuel combustion of a fuel selected from the group consisting of hydrocarbon fuels and carbonaceous fuels.

It should be noted that the percentages indicated for the various components in gas streams discussed below are approximate molar percentages (mol. %) calculated on a dry basis. In addition, all pressures discussed throughout the specification are absolute pressures and not gauge pressures, unless otherwise stated.

The method is suitable to remove acid mist from any gas stream. However, the method has particular application in removing acid mist from a gas stream comprising at least 40% carbon dioxide, or where the acid mist comprises at least one acid condensate selected from the group consisting of sulfurous acid, sulfuric acid, nitrous acid and nitric acid. The acid mist usually comprises sulfuric acid condensate and nitric acid condensate.

The method may be integrated in a method to remove at least one contaminant selected from the group consisting of $SO_2$ and $NO_x$ from a carbon dioxide feed gas comprising said contaminant(s). This method is suitable to remove the contaminant(s) from carbon dioxide feed gas from any source, for example from otherwise pure carbon dioxide. However, the method has particular application in removing the contaminant(s) from "impure" carbon dioxide feed gas, e.g. carbon dioxide gas having from about 90% to about 95% carbon dioxide, and more particularly in removing the contaminants from "crude" carbon dioxide gas, e.g. carbon dioxide feed gas having from about 40% to about 90% carbon dioxide. In preferred embodiments, the carbon dioxide feed gas has from about 60% to about 95% carbon dioxide; preferably, from about 65% to about 85% carbon dioxide.

In preferred embodiments, the carbon dioxide feed gas is, or is derived from, flue gas produced by combustion of a fuel selected from hydrocarbons and carbonaceous fuels. In such embodiments, the method usually involves the combustion of at least one fuel selected from the group consisting of hydrocarbons and carbonaceous fuels, in an $O_2$-rich gas, e.g. a gas comprising at least 80% $O_2$, optionally together with recycled flue gas from the combustion process to moderate the temperature of combustion and control heat flux. Such flue gas is a crude carbon dioxide gas typically having from about 40% to about 90% carbon dioxide.

The method may be used to remove acid mist from a gas stream having a flow rate from about 200 kmol/h to about 40,000 kmol/h. $SO_2$ and/or $NO_x$ may be removed as acid condensate from carbon dioxide feed gas having such a flow rate which is typical for net flue gas generated in an oxyfuel combustion process.

Where present, the amount of $SO_2$ contaminant in the carbon dioxide feed gas is usually more than 50 ppm but no more than about 10,000 ppm, and is typically from about 100 ppm to about 5,000 ppm.

Where present, the amount of $NO_x$ contaminant in the carbon dioxide feed gas is usually more than 100 ppm but no more than 10,000 ppm, and is typically from about 500 ppm to about 3,000 ppm. The majority of the $NO_x$ is usually NO with $NO_2$ being the second most abundant component of $NO_x$. The $NO_x$ may include other oxides of nitrogen such as $N_2O$, $N_2O_4$ and $N_2O_3$, but these oxides are usually in smaller quantities than $NO_2$.

Where the carbon dioxide feed gas comprises $O_2$ as a further contaminant, $O_2$ is typically present from about 0.1% to about 15%, e.g. from about 1% to about 8%, of the feed gas.

Where the carbon dioxide feed gas comprises water as a further contaminant, the amount of water present depends on a number of factors. For example, where the feed gas is generated by oxyfuel combustion of a fuel, the amount of water present in the gas would depend not only on the composition of the fuel and combustion conditions, but also whether and, if so, the extent to which the flue gas is cooled by washing in water prior to compression. In this case, the amount of water present will depend on the saturated vapor pressure at the conditions to the inlet of the compressor. As a general guide, the amount of water is usually from about 0.1% to about 30% of the feed gas. For example, at about 1 bar (0.1 MPa), a 10° C. feed to the compressor provides about 1.2% water, a 20° C. to 40° C. feed would give from about 2% to 8% water, and a 60° C. feed would give about 20% water.

The carbon dioxide feed gas usually comprises at least one non-condensable gas selected from the group consisting of nitrogen ($N_2$), argon (Ar); rare gases such as krypton (Kr) and xenon (Xe), and mixtures thereof. Where present in the carbon dioxide feed gas, $N_2$ is typically present in an amount from about 5% to about 30% of the feed gas; Ar is typically present in an amount from about 0.1 mol % to about 10 mol % of the feed gas; Kr is typically present in an amount from about 0.5 ppm to about 1.5 ppm; and Xe is typically present in an amount from about 30 ppb to about 150 ppb.

Flue gas generated in an oxyfuel combustion process usually contains carbon dioxide as the major component, with $SO_x$, $NO_x$ and the non-condensable gases $O_2$, $N_2$, Ar, Kr and Xe. $SO_x$ is produced by the combustion of elemental sulfur and/or sulfur-containing compounds present in the fuel. $O_2$ is present in the flue gas from excess $O_2$ used in the combustion and from air ingress into the combustion unit which is also responsible for the presence of $N_2$, Ar, Kr and Xe in the flue gas. $NO_x$ is produced by reaction $N_2$ with $O_2$ in the combustion unit. These components are usually present in the amounts indicated above.

Further components in the flue gas include solid particulates such as fly ash and soot; water; CO; HCl; $CS_2$; $H_2S$; HCN; HF; volatile organic compounds (VOCs) such as $CHCl_3$; metals including mercury, arsenic, iron, nickel, tin, lead, cadmium, vanadium, molybdenum and selenium; and compounds of these metals.

Where present, $SO_2$ is converted primarily to sulfuric acid ($H_2SO_4$) as the inorganic acid derivative thereof, although sulfurous acid ($H_2SO_3$) may also be present, albeit usually only in relatively small amounts. For example, from 0% to about 30% of the total amount of $SO_2$ that is converted in the method is understood to be typically converted to sulfurous acid with the balance being sulfuric acid. If present, sulfurous acid would be in the form of an aqueous solution of the bisulfite anion ($HSO_3^-$) formed by an equilibrium reaction of $SO_2$ with water.

Where present, $NO_x$ is converted primarily to nitric acid ($HNO_3$) as the inorganic acid derivative thereof, although nitrous acid ($HNO_2$) may also be present, albeit usually only in relatively small amounts. For example, from 0% to about 16% of the total amount of $NO_x$ that is converted in the method is understood to be typically converted to nitrous acid with the balance being nitric acid. Nitrous acid is formed, together with nitric acid, by the disproportionation in water of nitrogen dioxide. Nitrous acid rapidly decomposes into nitrogen dioxide, nitric acid and water when is aqueous solution.

A part of the acid condensate is produced in the form of an acid mist. The proportion of the total amount of acid condensate produced by the method that is in the form of the acid mist is typically from about 0.01% to about 2%. For example, considering an acid conversion of 90% $SO_x$ and 70% $NO_x$ and a design acid mist loading of 0.3 g acid mist/$Nm^3$ process gas, the Inventor has calculated a design (i.e. maximum) proportion of acid mist of about 1%. The remainder is not suspended in the gas stream as acid mist. In contrast, the remainder is usually in the form of unsuspended acid condensate.

At elevated pressure operation, consideration must be given for retention of the fibers of the mist eliminator following depressurization. A rapid depressurization could result in loss of the fibers due to the high gas velocity potentially generated. Therefore, a means for retaining the fibers should be provided, such as a wire cage or mesh basket. Thus, a fiber bed mist eliminator according to the present invention usually comprises at least one layer of fibers contained between an outer and inner acid resistant metal cage assembly to form a densely packed unit. The fibers are preferably randomly distributed within a bed.

In some embodiments, the mist eliminator has a single bed of fibers and an example of a single fiber bed mist eliminator is disclosed in U.S. Pat. No. 3,540,190, the disclosure of which is incorporated herein by reference. In other embodiments, the mist eliminator has at least two beds of fibers. These beds may include a first fiber bed to collect acid mist particles, and a second fiber bed adjacent the first bed to prevent re-entrainment of collected acid mist particles. An example of a dual fiber bed mist eliminator is disclosed in U.S. Pat. No. 4,818,257, the disclosure of which is incorporated herein by reference. Such exemplified fiber bed mist eliminators would be suitable for use with the present invention provided they are modified as required to operate at elevated pressures.

A fiber bed mist eliminator is usually a unit having a hollow cylindrical configuration, comprising an outside surface and an inside surface, and which is sealed at one end. The opposite end is open to allow the passage of gas into or out of the unit. The unit may be arranged such that the gas containing the acid mist passes radially through the fiber bed(s) either from the outside surface of the unit to the inside surface (as in U.S. Pat. No. 3,540,190), or from the inside surface of the unit to the outside surface (as in U.S. Pat. No. 4,818,257).

The fibers are usually inorganic fibers such as glass fibers, although fibers made from other acid resistant materials such as polyesters; polyvinyl chlorides; polyalkylenes such as polyethylene and polypropylene; polyethylene teraphthalate; fluoropolymers such as Teflon™; and nylons, may also be used. The fibers are usually uncoated although may be coated, e.g. with a material providing lyophobic or hydrophilic properties. The fibers may have any suitable configuration but curved or wavy fibers are preferred. The fiber bed mist eliminators may comprise a mixture of different fibers.

Suitable fibers may have a mean fiber diameter from about 5 μm to about 500 μm, e.g. from about 5 μm to about 100 μm, or from about 5 μm to about 50 μm.

The fibers in a bed may be compressed to a bulk density from about 5 to about 20 lb/ft$^3$ (80 to 320 kg/m$^3$). In general, smaller diameter fibers will require higher packing densities than larger diameter fibers. For example, packing densities from about 8 to about 20 lb/ft$^3$ (128 to 320 kg/m$^3$) will usually be needed for fibers having diameters from about 5 μm to about 15 μm, whereas packing densities of about 5 to about 10 lb/ft$^3$ (80 to 160 kg/m$^3$) will usually be needed for fibers having diameters from about 15 μm to about 30 μm. In particular, the mist eliminator may comprise fibers having diameters from about 8 μm to about 20 μm compressed to a packing density of about 7 to about 12 lb/ft$^3$ (112 to 192 kg/m$^3$).

The fiber bed may have an at least substantially uniform bed voidage from about 85% to about 99%. Where the mist eliminator has two fiber beds, the first fiber bed may have a voidage from about 85% to 95% and the second fiber bed may have a voidage from about 95% to about 99%.

The Inventor believes that particles of acid condensate collected by the fibers coalesce on the fibers to form droplets which move radially through the fiber bed towards the distal surface of the fiber bed due to the pressure drop across the bed, and continue to grow in size on the way as the acid mist collects. A film of acid condensate forms on the fibers at the distal surface and drains under gravity from the bed. Acid condensate collected at the base of the fiber bed may then be distributed as required.

There is an inherent pressure drop across a fiber bed mist eliminator. At elevated pressure, the Inventor believes that this pressure drop will typically be from about 5 mbar to about 50 mbar (0.5 kPa to 5 kPa).

The contaminant(s)-depleted carbon dioxide gas produced by preferred embodiments of the method is at least substantially free of acid mist. The term "substantially free" is intended to mean that the carbon dioxide gas comprises no more than about 10 parts per billion ("ppbv") acid mist, and preferably no more than 100 parts per trillion ("pptv") acid mist. In preferred embodiments, the contaminant(s)-depleted carbon dioxide gas is free of acid mist.

Preferred embodiments of the method can typically remove at least 80% of any $SO_2$ contaminant present in the carbon dioxide feed gas to produce $SO_2$-depleted carbon dioxide gas. The method usually removes at least 90% of any $SO_2$ contaminant and, in some embodiments, the method removes substantially all (e.g. at least 95%) of any $SO_2$ contaminant in the carbon dioxide gas to produce substantially $SO_2$-free carbon dioxide gas.

Preferred embodiments of the method can typically remove at least 40% of any $NO_x$ contaminant present in the carbon dioxide feed gas to produce $NO_x$-lean carbon dioxide gas. The method usually removes at least 60% of any $NO_x$ contaminant, and in some embodiments, the method removes at least 90% of any $NO_x$ contaminant. Preferably, the method removes at least the bulk of any $NO_x$ contaminant, e.g. from about 40% to about 99.9% and, in some preferred embodiments, from about 60% to about 95%.

$SO_2$ and/or $NO_x$ may be converted to sulfuric acid and/or nitric acid respectively by any suitable process involving a condensation step. For example, $SO_2$ and/or NO may be oxidized in the presence of $O_2$ over at least one solid oxidation catalyst to produce $SO_3$ and/or $NO_2$ respectively which may be condensed in the presence of water at a temperature below the acid dew point to form sulfuric acid condensate and/or nitric acid condensate respectively. The catalyst is typically a transition metal oxide such as vanadium pentoxide, supported on an inert support. $O_2$ may be added to the carbon dioxide gas, although at least sufficient and often excess $O_2$ may already be present in the gas as a contaminant. Such an oxidation reaction preferably takes place at elevated pressure, e.g. from about 5 bar to about 50 bar (0.5 MPa to 5 MPa), and at an elevated temperature, e.g. from about 300° C. to about 700° C.

Once oxidized, the gas is typically cooled to a temperature from ambient temperature to below the acid dew point, in the presence of water to prompt formation of the acid condensate. The temperature to which the gas is cooled may be from about 20° C. to about 150° C., e.g. from about 25° C. to about 100° C., and preferably from about 30° C. to about 50° C. It should be noted that the potential for acid mist formation may be increased in the preferred range of these temperatures.

Water may be added to the resultant carbon dioxide gas containing $SO_3$ and/or $NO_2$, although at least sufficient and often excess water may already be present in the gas as a contaminant.

$SO_2$ and/or $NO_x$ is, however, preferably converted to sulfuric acid condensate and/or nitric acid condensate respectively by maintaining the carbon dioxide feed gas at elevated pressure(s) in the presence of $O_2$ and water and, where $SO_2$ is to be removed, $NO_x$, in a reactor system for a period of time sufficient to convert $NO_x$ to nitric acid. In these embodiments, the method comprises recycling the coalesced acid condensate to at least one point within the reactor system.

NO is converted to nitric acid and $SO_2$ is converted to sulfuric acid, in the presence of $O_2$ and water, by the following series of reactions which are referred to herein as "sour compression" reactions:

It has been determined that the rate of reaction (i) is increased as the reaction pressure increases. The elevated pressure(s) for the sour compression reactions is usually at least about 3 bar (0.3 MPa) e.g. at least about 5 bar (0.5 MPa). The elevated pressure is usually no more than 100 bar (10 MPa), and preferably no more than 50 bar (5 MPa). In preferred embodiments, the elevated pressure is from about 5 bar to about 50 bar (0.5 MPa to 5 MPa).

If the pressure of the coalesced acid condensate is equal to the elevated pressure of the point in the reactor system where it is to be recycled, the coalesced acid condensate is typically recycled without pressure adjustment. However, where the pressure of the coalesced acid condensate is not equal to the elevated pressure(s) of the reactor system at the point(s) at which the coalesced acid condensate is to be recycled, the method typically comprises adjusting the pressure of the coalesced acid condensate to equal the elevated pressure of the reactor system at the recycle point, prior to recycling the coalesced acid condensate.

Due to the inherent pressure drop across the fiber bed mist eliminator(s), the pressure of the coalesced acid condensate is usually lower than the elevated pressure of the reactor system. In this case, the method may comprises pumping the acid condensate to the required elevated pressure before recycling the liquid to the reactor system.

Recycling the coalesced acid condensate usually improves the efficiency and reliability of the sour compression reactions by retaining reactive compounds within the system. This benefit may increase overall conversion of the reactions by retaining key reactants and products within the system, resulting in greater process efficiency.

The sour compression reactions take place at elevated pressure. Since the present invention is designed to operate at elevated pressure, recycling the coalesced acid condensate to the sour compression reactor system will improve the sour compression process without added complexity, such as additional external filtration systems.

Recycling the liquid acid condensate also reduced the number of steps and requirements to handle the acid by-product and limits acid losses which can also have an added benefit of increased safety of the process.

If $SO_2$ is to be removed and $NO_x$ is not already present in the feed gas as a further contaminant, then $NO_x$ may be added to the gas upstream of the reactor system. The amount of $NO_x$ to be added may be from about 100 ppm to about 10,000 ppm, e.g. about 500 ppm to about 3,000 ppm. However, as indicated above, the invention has particular application in methods for purifying carbon dioxide feed gas that is contaminated by both contaminants in which case additional $NO_x$ is unlikely to be required.

$O_2$ and/or water may be added to the carbon dioxide feed gas upstream of the reactor system. However, in preferred embodiments, at least sufficient and often excess amounts of these components are present in the feed gas in any event in which case additional $O_2$ and/or water would not be required.

The temperature at which the sour compression reactions take place in the reactor system may be from ambient temperature to below the acid dew point. For example, the temperature may be from about 20° C. to about 150° C., e.g. from about 25° C. to about 100° C., or from about 30° C. to about 50° C.

Residence time in the reactor system (i.e. contact time or "hold up" time) determines the degree or extent of the sour compression reactions. In this connection, the period of time required for converting $NO_x$ to nitric acid is typically longer than that required for converting $SO_2$ to sulfuric acid. This period of time is usually no more than 1000 s, and preferably no more than 600 s. This period of time is usually more than 5 s, e.g. more than 10 s or more than 20 s. The period of time may be from 5 s to about 600 s, e.g. from about 10 s to about 500 s or from about 15 s to about 200 s. It should be noted that, whilst the sour compression reactions begin as soon as the pressure and temperature conditions allow, the reactions typically progress to a significant extent only after about 5 s, and usually only after about 10 s or even 20 s.

The reactor system for the sour compression reactions simply provides a sufficient volume for a given flow rate within which the reactions may take place at elevated pressure(s). The reactor system usually comprises at least one pressurizable reactor vessel such as a pipe or duct; a tank; an absorption column; a wet scrubbing tower; fluidized or moving bed; packed tower or column; and a Venturi scrubber. Where the reactor system comprises a countercurrent gas/liquid contact column, acid condensate may be removed from the bottom of the column, pumped, cooled and fed as reflux to the top of the column.

The reactor system may comprise a single pressurizable reactor vessel for operation at a single elevated pressure within the range of suitable pressures. In other embodiments, the reactor system may comprise at least two (same or different) pressurizable reactor vessels for operation at either the same or different elevated pressures.

Where there are at least two reactor vessels for operation at different elevated pressures, a gas compression arrangement may be provided to compress the gaseous effluent from the elevated operating pressure of a first vessel to the elevated operating pressure of a second vessel. The gas compression arrangement may be at least one stage of a multiple stage gas compressor.

In a particularly preferred embodiment, the reactor system comprises a first gas/liquid contact column for operation at a first elevated pressure, and a second gas/liquid contact column for operation at a second elevated pressure that is higher than the first elevated pressure. The first and second elevated pressures are typically both within the preferred ranges given above. The first elevated pressure may be from about 10 bar to about 20 bar (1 MPa to 2 MPa) and the second elevated pressure may be from about 25 bar to about 35 bar (2.5 MPa to 3.5 MPa). Where both $SO_2$ and $NO_x$ are present as contaminants in the carbon dioxide gas to be processed in such embodiments, both columns usually produce mixed acid condensate with the first column producing predominantly sulfuric acid condensate and the second column producing predominantly nitric acid condensate.

Further details of the sour compression reactions themselves and of suitable sour compression reactor systems are provided in US 2007/0122328 A1, the disclosure of which is incorporated herein by reference.

The elevated pressure(s) of the reactions to convert $SO_2$ and/or $NO_x$ to the inorganic acid derivative(s) is preferably selected so that the contaminant(s)-depleted carbon dioxide gas containing the acid mist may be fed directly to the fiber bed mist eliminator(s) without pressure adjustment. In these embodiments, the elevated pressure of the contaminant conversion reaction is the same as the elevated feed pressure to the fiber bed mist eliminator(s), subject to any inherent pressure drop in the apparatus.

In a preferred embodiment, the method comprises removing $SO_2$ and $NO_x$ from a stream of carbon dioxide feed gas by maintaining the carbon dioxide feed gas in the presence of $O_2$ and water at elevated pressure(s) in a reactor system for a period of time sufficient to convert $SO_2$ to sulfuric acid and $NO_x$ to nitric acid to produce a stream of $SO_2$-depleted, $NO_x$-lean carbon dioxide gas and the sulfuric and nitric acids in the form of an acid condensate, a part of the acid condensate being suspended in the $SO_2$-depleted, $NO_x$-lean carbon dioxide gas as an acid mist; separating at least a portion of the acid condensate that is not suspended as acid mist from the stream of $SO_2$-depleted, $NO_x$-lean carbon dioxide gas; removing the acid mist from the stream of $SO_2$-depleted, $NO_x$-lean carbon dioxide gas by passing the stream through at least one fiber bed mist eliminator to produce coalesced acid condensate and a stream of $SO_2$-depleted, $NO_x$-lean carbon dioxide gas that is at least substantially free of the acid mist, wherein the stream of $SO_2$-depleted, $NO_x$-lean carbon dioxide gas is fed to the fiber bed mist eliminator(s) at an elevated pressure; and recycling the coalesced acid condensate within the reactor system.

In embodiments where the carbon dioxide feed gas is, or is derived from, flue gas generated in an oxyfuel combustion unit, the flue gas from the combustion unit is typically pretreated by washing with water to remove solid particulates (such as soot and/or fly ash) and water soluble components (such as HF, HCl and/or $SO_3$). Additionally, the flue gas may be filtered, using equipment such as a baghouse or electrostatic precipitator, to enhance particulate removal.

If the flue gas is at atmospheric pressure after any such pre-treatment, then it is compressed to the elevated pressure to form the carbon dioxide feed gas to be purified by the method. However, if the feed gas originates from a source, such as a pressurized oxyfuel combustion system or a pressurized pre-treatment step that is already at the required elevated pressure, then compression is not required.

Feed gas may be compressed in a single stage or in more than one stages, with or without interstage cooling using heat exchangers. If interstage cooling is used, then means (e.g. "knockout" pots) should be provided to capture and remove any condensate that is formed during the compression step.

The temperature of the feed gas after compression may range from ambient to about 500° C., subject to the extent of intercooling. If the gas is compressed in multiple stages, then the extent to which the gas is intercooled may be calculated and carefully controlled so as to provide the feed gas not only at the required elevated pressure but also at the desired temperature so that any additional post-compression heating or cooling of the gas is minimized or even eliminated entirely. Alternatively, the temperature of the feed gas may be adjusted as required after compression. For example, the gas may be cooled to the desired reaction temperature by indirect heat exchange with a coolant, e.g. cooling water, or the gas may be heated to the desired reaction temperature by indirect heat exchange with a heat transfer fluid, e.g. steam.

At least a portion of the $SO_x$-depleted ($NO_x$-lean) carbon dioxide gas produced by preferred embodiments of the present invention may be further processed to purify the carbon dioxide. For example, the method of the present invention may be integrated with a carbon dioxide recovery and purification system operating at an elevated pressure. The elevated pressure(s) of the present invention and the elevated pressure of the downstream system would usually be selected such that the $SO_2$-depleted ($NO_x$-lean) carbon dioxide gas, or a $SO_2$-depleted ($NO_x$-lean) carbon dioxide gas derived therefrom, can be fed to the downstream system without any pressure adjustment, taking account of any inherent pressure drop in the apparatus.

In preferred embodiments in which the gas comprises water vapor and "non-condensable" gases such as $N_2$, $O_2$ and Ar, the $SO_x$-depleted ($NO_x$-lean) carbon dioxide gas is usually dried, purified to remove the "non-condensable" components, and compressed to a pipeline pressure from about 80 bar (8 MPa) to about 250 bar (25 MPa). The gas may then be stored in geological formations or in deep sea locations, or may be used in EOR processes.

The $SO_2$-depleted ($NO_x$-lean) carbon dioxide gas may be dried in a desiccant drier and then cooled to a temperature close to its triple point where the "non-condensable" components are removed as gases in a vent stream. This process allows the carbon dioxide loss with the vent stream to be minimized by fixing the feed gas pressure at an appropriate level, e.g. from about 20 bar (2 MPa) to about 40 bar (4 MPa).

Suitable "non-condensable" components removal processes for use with the present invention are described in "*Oxyfuel conversion of heaters and boilers for $CO_2$ capture*" (Wilkinson et al., Second National Conference on Carbon Sequestration; May 5-8, 2003; Washington D.C.); US 2008/0173584 A1; US 2008/0173585 A1; and US 2008/0176174 A1, the disclosure of each of which is incorporated herein by reference. If the present method is used to remove $SO_2$ and $NO_x$ from flue gas produced in an oxyfuel combustion process and is integrated with one of these "non-condensable" components removal methods, then the integrated process typically leads to $CO_2$ purities of 95% to 99.99%, and to $CO_2$ recoveries of 90% to 99%.

The apparatus comprises a pressurizable vessel suitable for operating at an elevated pressure. The vessel comprises an interior divided into a first, usually lower, zone and a second, usually upper, zone by a partition wall; a gas inlet to the first zone, and a gas outlet from the second zone. The apparatus also comprises at least one fiber bed mist eliminator mounted on the partition wall providing a gas flow path from the first zone to the second zone; and a liquid outlet for removing coalesced acid condensate from the second zone.

In preferred embodiments, the apparatus comprises a reactor system for removing at least one contaminant selected from the group consisting of $SO_2$ and $NO_x$, from carbon dioxide feed gas comprising the contaminant(s) by maintaining the feed gas at elevated pressure(s) in the presence of $O_2$ and water and, where $SO_2$ is to be removed, $NO_x$, for a period of time sufficient to convert the contaminant to at least one inorganic acid derivative thereof to produce contaminant(s)-depleted carbon dioxide gas and the inorganic acid derivative(s) as an acid condensate; and a separation system for separating acid condensate that is not suspended as an acid mist, from the stream of contaminant(s)-depleted carbon dioxide gas. In such embodiments, the at least one pressurizable vessel is a component of the reactor system. For example, a pressurizable vessel of the apparatus is a gas/liquid contact column of the reactor system.

The apparatus may further comprise a conduit arrangement for recycling the coalesced acid condensate from the liquid outlet within the reactor system. The conduit arrangement for recycling the coalesced acid condensate may be provided internally within or externally of the reactor system. The conduit arrangement may comprise a pressure adjustment arrangement for adjusting the pressure of the coalesced acid condensate.

Where the reactor system comprises a gas/liquid contact column, the coalesced acid condensate may be recycled to the sump of the column or to a liquid distributor provided above a packed section in the column.

The coalesced acid condensate may be recycled to the reactor system hydraulically via at least one seal leg to seal against the differential pressure or through via a pressure transfer arrangement.

In a seal leg, a hydraulic height of liquid overcomes the pressure drop of the mist eliminator (and, possibly, the reactor packing, if any) and allows the liquid to be recycled back to the reactor system. In embodiments involving at least two different pressure stages for the sour compression reactions, if the seal leg is provided in higher pressure stage, then the condensate from the higher pressure stage may be transferred easily to the lower pressure stage.

Pressure transfer refers to using available higher pressure process gas to batch transfer condensed liquid by intermittently pressurizing the condensate containing vessel and opening a valve leading to a lower pressure downstream process vessel. The liquid will flow out the bottom of the vessel and continue flowing until it is exhausted as long as there is remaining liquid level in the vessel.

The reactor system may be in a separate vessel from the separation system. However, in preferred embodiments, the separation system is provided within the same vessel as the reactor system. For example, where the reactor system is a gas/liquid contact column, the separator system may comprise a sump of the column and an outlet at or near the base of the column to allow liquid condensate bottoms to be removed from the column.

It would be well within the ability of the skilled practitioner to calculate the number of fiber bed mist eliminators that would be needed for a particular embodiment of the present invention. However, the number of fiber bed mist eliminators located on a tube sheet at the top of a gas/liquid contact column may be from 1 to 40, depending inter alia on the size of the column and the flow rate/velocity of the gas to be processed.

The fiber bed mist eliminator(s) may be located within the reactor system, at or near the reactor system gaseous product outlet, or in other system vessels such as vapor/liquid separators. In preferred embodiments in which the reactor system comprises at least one gas/liquid contact column, the fiber beds may be mounted on a tube sheet provided near the top of the column near the outlet for the column overhead.

Aspects of the invention include:

1. A method for removing acid mist from a gas stream, said method comprising passing said gas stream through at least one fiber bed mist eliminator to produce coalesced acid condensate and a gas stream that is at least substantially free of acid mist, wherein said gas stream is fed to said fiber bed mist eliminator(s) at an elevated pressure.

2. A method according to #1, wherein said elevated pressure is at least 2 bar (0.2 MPa).

3. A method according to #1 or #2, wherein said elevated pressure is no more than about 100 bar (10 MPa).

4. A method according to any of #1 to #3, wherein said elevated pressure is from about 4 bar to about 50 bar (0.4 to 5 MPa).

5. A method according to any of #1 to #4, wherein said gas stream has a flow rate from about 200 kmol/h to about 40,000 kmol/h.

6. A method according to any of #1 to #5, wherein at least 40% of said gas stream is carbon dioxide gas, and said acid mist consists of at least one acid condensate selected from the group consisting of sulfurous acid, sulfuric acid, nitrous acid and nitric acid.

7. A method according to any of #1 to #6, comprising removing at least one contaminant selected from the group consisting of $SO_2$ and $NO_x$, from a stream of carbon dioxide feed gas by:

converting said contaminant(s) in a carbon dioxide feed gas to at least one inorganic acid derivative thereof to produce a stream of contaminant(s)-depleted carbon dioxide gas and said inorganic acid derivative(s) as an acid condensate, a part of said acid condensate being suspended in said contaminant(s)-depleted carbon dioxide gas as said acid mist; and separating at least a portion of said acid condensate that is not suspended as acid mist from said stream of contaminant(s)-depleted carbon dioxide gas to produce said gas stream containing said acid mist.

8. A method according to #7, wherein said at least one contaminant is converted to said at least one inorganic acid derivative thereof by maintaining said carbon dioxide feed gas in the presence of $O_2$ and water and, where $SO_2$ is to be removed, $NO_x$, at elevated pressure(s) in a reactor system for a period of time sufficient to convert $NO_x$ to nitric acid, said method comprising recycling said coalesced acid condensate within said reactor system.

9. A method according to #8 or #9, wherein said coalesced acid condensate is at a first pressure which is not equal to the elevated pressure(s) of said reactor system at said point(s) at which said coalesced acid condensate is to be recycled, said method comprising adjusting the pressure of said coalesced acid condensate to equal the elevated pressure(s) of said reactor system at said point(s), prior to recycling said coalesced acid condensate.

10. A method comprising removing $SO_2$ and $NO_x$ from a stream of carbon dioxide feed gas by maintaining said carbon dioxide feed gas in the presence of $O_2$ and water at elevated pressure(s) in a reactor system for a period of time sufficient to convert $SO_2$ to sulfuric acid and $NO_x$ to nitric acid to produce a stream of $SO_2$-depleted, $NO_x$-lean carbon dioxide gas and said sulfuric and nitric acids in the form of an acid condensate, a part of said acid condensate being suspended in said $SO_2$-depleted, $NO_x$-lean carbon dioxide gas as said acid mist; separating at least a portion of said acid condensate that is not suspended as acid mist from said stream of $SO_2$-depleted, $NO_x$-lean carbon dioxide gas; removing said acid mist from said stream of $SO_2$-depleted, $NO_x$-lean carbon dioxide gas by passing said stream through at least one fiber bed mist eliminator to produce coalesced acid condensate and a stream of $SO_2$-depleted, $NO_x$-lean carbon dioxide gas that is at least substantially free of said acid mist, wherein said stream of $SO_2$-depleted, $NO_x$-lean carbon dioxide gas is fed to said fiber bed mist eliminator(s) at an elevated pressure; and recycling said coalesced acid condensate within said reactor system.

11. Apparatus for removing acid mist from a gas stream, said apparatus comprising:

a pressurizable vessel suitable for operating at an elevated pressure, said vessel comprising an interior divided into a first zone and a second zone by a partition wall; a gas inlet to said first zone, and a gas outlet from said second zone;

at least one fiber bed mist eliminator mounted on said partition wall providing a gas flow path from said first zone to said second zone; and a liquid outlet for removing coalesced acid condensate from said second zone.

12. Apparatus according to #11, said apparatus comprising:

a reactor system for removing at least one contaminant selected from the group consisting of $SO_2$ and $NO_x$ from carbon dioxide feed gas comprising said contaminant(s) by maintaining said feed gas at elevated pressure(s) in the presence of $O_2$ and water and, where $SO_2$ is to be removed, $NO_x$, for a period of time sufficient to convert said contaminant to at least one inorganic acid derivative thereof to produce contaminant(s)-depleted carbon dioxide gas and said inorganic acid derivative(s) as an acid condensate; and a separation system for separating acid condensate that is not suspended as an acid mist from said stream of contaminant(s)-depleted carbon dioxide gas;

wherein said at least one pressurizable vessel is a component of said reactor system.

13. Apparatus according to #12, comprising a conduit arrangement for recycling coalesced acid condensate from said liquid outlet within said reactor system.

14. Apparatus according to #13, wherein said conduit arrangement comprises a pressure adjustment arrangement for adjusting the pressure of the coalesced acid condensate.

15. Apparatus comprising
 a reactor system for removing $SO_2$ and $NO_x$ from carbon dioxide feed gas comprising $SO_2$ and $NO_x$ as contaminants by maintaining said feed gas at elevated pressure(s) in the presence of $O_2$ and water for a period of time sufficient to convert $SO_2$ to sulfuric acid and $NO_x$ to nitric acid to produce $SO_2$-depleted, $NO_x$-lean carbon dioxide gas and said sulfuric and nitric acids as an acid condensate; and
 a separation system for separating acid condensate that is not in the form of an acid mist from a stream of $SO_2$-depleted, $NO_x$-lean carbon dioxide gas,
wherein said reactor system comprises:
 a pressurizable vessel suitable for operating at an elevated pressure, said vessel comprising an interior divided into a first zone and a second zone by a partition wall; a gas inlet to said first zone, and a gas outlet from said second zone;
 at least one fiber bed mist eliminator mounted on said partition wall providing a gas flow path from said first zone to said second zone;
 a liquid outlet for removing coalesced acid condensate from said second zone; and
 a conduit arrangement for recycling coalesced acid condensate from said liquid outlet within said reactor system.

Figure 1:
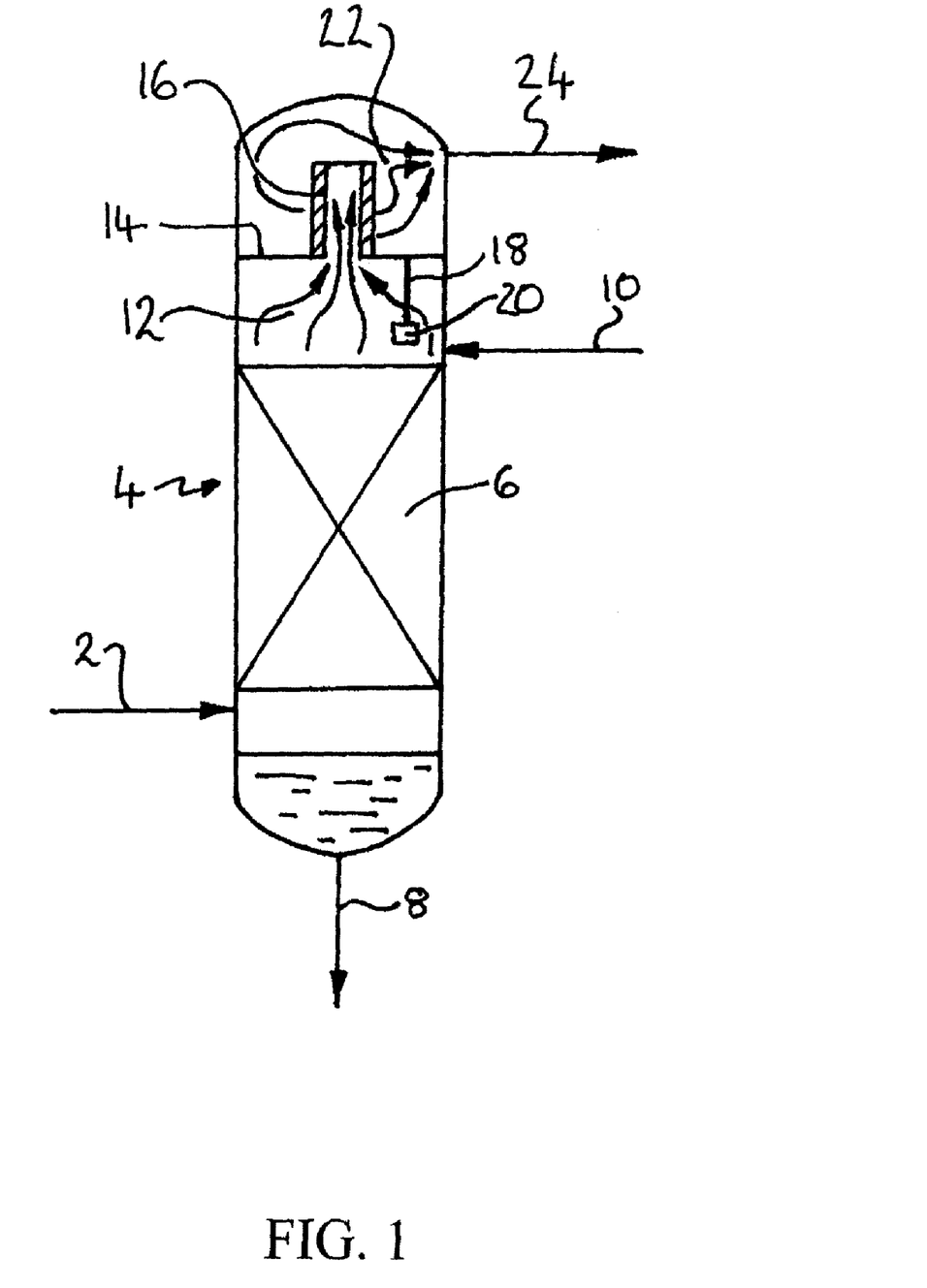
FIG. 1 is a schematic representation of one embodiment of the present invention.

The following is a discussion of the embodiment of the present invention exemplified in FIG. 1.

Referring to FIG. 1, a stream 2 of washed, compressed and cooled flue gas generated in an oxyfuel combustion unit (not shown) is fed at a temperature of about 35° C. to a countercurrent gas/liquid contact column 4 operating at an elevated pressure of about 30 bar (3 MPa). The flue gas comprises about 72% carbon dioxide, about 19% $N_2$, about 6% $O_2$ and about 3% Ar, together with about 2500 ppm $SO_2$ and about 1500 ppm $NO_x$ and other contaminants including water and CO.

The function of the column is to provide sufficient "holdup" time such that $SO_2$ and $NO_x$ from the flue gas are converted to sulfuric acid and nitric acid respectively in the form of an acid condensate by the sour compression reactions discussed above. The column has at least one packed section 6 to help provide the necessary hold up time and to increase the contact between the ascending gaseous phase and descending liquid phase within the column.

Acid condensate collects as bottoms liquid in the sump of the column 4 and is removed as stream 8. At least a part of this stream is pumped in a pump (not shown), cooled by indirect heat exchanger in a heat exchanger (not shown) and fed to the top of the column, optionally with additional make-up water (not shown), as stream 10 to provide reflux to the column 4.

$SO_2$-depleted, $NO_x$-lean carbon dioxide gas 12 comprising a mist of acid condensate leaves the top of the packed section 6 and passes through a tube sheet 14 on which is mounted at least one fiber bed mist eliminator 16. The or each mist eliminator comprises an annular or cylindrical bed of densely packed glass fibers supported between inner and outer layers or cages of wire mesh (not shown). In this way, the mist eliminator(s) provide a large surface area on which the acid mist is collected.

In this example, the mist eliminator(s) 16 is mounted on the tube sheet 14 such that the gas travels from the inside of the eliminator(s) 16 to the outside. However, it is to be understood that the mist eliminator(s) 16 may be mounted on the tube sheet 14 such that the gas travels from the outside of the mist eliminator(s) 16 to the inside or, where there a plurality of mist eliminators, there is at least one mist eliminator mounted on the tube sheet in each orientation.

The acid mist is removed from the gas as the gas passes radially through the fiber bed of the mist eliminator(s). In this connection, the microdroplets of liquid condensate forming the mist collect on the fibers of the mist eliminator 16 and travel radially through the mist eliminator 16 towards the outside, coalescing with other collected microdroplets along the way. Once at the outside surface, the coalesced liquid condensate travels down the outside of the mist eliminator 16 to the tube sheet 14 and is then re-introduced to the column 4 via an outlet in the tube sheet using a seal leg 18 and seal pot 20. The seal pot 20 provides a hydraulic seal to overcome the inherent pressure differential across the fiber bed of the mist eliminator 16.

The $SO_2$-depleted, $NO_x$-lean carbon dioxide gas 22 leaving the fiber bed mist eliminator(s) is at least substantially free of acid mist and is removed from the column as stream 24.

Advantages of the present invention include:
 limitation of corrosion of downstream equipment including compression systems, piping and components, and temperature swing adsorbers (TSAs) which may allow the selection of lower cost materials of construction for downstream equipment and/or greater operating life for consumable materials such as adsorbents;
 less complex requirements for upstream separation systems, such as added external vapor/liquid separator vessels, large disengagement height requirements, and/or complex liquid distributors within reaction columns. A high efficiency mist eliminator judiciously placed within an existing vessel in the process may eliminate the need for other more complex separations systems; and
 more uniform temperature control in the column, as entrained and condensation-based acid droplets and mist returned to the reaction may retain more of the process energy. This would result in greater energy efficiency and a more uniform temperature throughout the packed reaction column(s).

It will be appreciated that the invention is not restricted to the details described above with reference to the preferred embodiments but that numerous modifications and variations can be made without departing form the spirit or scope of the invention as defined in the following claims.

The invention claimed is:

1. A method for removing acid mist from a gas stream, said method comprising passing said gas stream through at least one fiber bed mist eliminator to produce coalesced acid condensate and a gas stream that is at least substantially free of acid mist, wherein said gas stream is fed to said fiber bed mist eliminator(s) at an elevated pressure.

2. The method of claim 1, wherein said elevated pressure is at least 2 bar (0.2 MPa).

3. The method of claim 1, wherein said elevated pressure is no more than about 100 bar (10 MPa).

4. The method of claim 1, wherein said elevated pressure is from about 4 bar to about 50 bar (0.4 to 5 MPa).

5. The method of claim 1, wherein said gas stream has a flow rate from about 200 kmol/h to about 40,000 kmol/h.

6. The method of claim 1, wherein at least 40% of said gas stream is carbon dioxide gas, and said acid mist consists of at least one acid condensate selected from the group consisting of sulfurous acid, sulfuric acid, nitrous acid and nitric acid.

7. The method of claim 1, comprising removing at least one contaminant selected from the group consisting of sulfur dioxide ($SO_2$) and oxides of nitrogen ($NO_x$), from a stream of carbon dioxide feed gas by:
  converting said contaminant(s) in a carbon dioxide feed gas to at least one inorganic acid derivative thereof to produce a stream of contaminant(s)-depleted carbon dioxide gas and said inorganic acid derivative(s) as an acid condensate, a part of said acid condensate being suspended in said contaminant(s)-depleted carbon dioxide gas as said acid mist; and
  separating at least a portion of said acid condensate that is not suspended as acid mist from said stream of contaminant(s)-depleted carbon dioxide gas to produce said gas stream containing said acid mist.

8. The method of claim 7, wherein said at least one contaminant is converted to said at least one inorganic acid derivative thereof by maintaining said carbon dioxide feed gas in the presence of oxygen ($O_2$) and water and, where $SO_2$ is to be removed, $NO_x$, at elevated pressure(s) in a reactor system for a period of time sufficient to convert $NO_x$ to nitric acid, said method comprising recycling said coalesced acid condensate within said reactor system.

9. The method of claim 8, wherein said coalesced acid condensate is at a first pressure which is not equal to the elevated pressure(s) of said reactor system at said point(s) at which said coalesced acid condensate is to be recycled, said method comprising adjusting the pressure of said coalesced acid condensate to equal the elevated pressure(s) of said reactor system at said point(s), prior to recycling said coalesced acid condensate.

10. A method comprising:
  removing $SO_2$ and $NO_x$ from a stream of carbon dioxide feed gas by maintaining said carbon dioxide feed gas in the presence of $O_2$ and water at elevated pressure(s) in a reactor system for a period of time sufficient to convert $SO_2$ to sulfuric acid and $NO_x$ to nitric acid to produce a stream of $SO_2$-depleted, $NO_x$-lean carbon dioxide gas and said sulfuric and nitric acids in the form of an acid condensate, a part of said acid condensate being suspended in said $SO_2$-depleted, $NO_x$-lean carbon dioxide gas as an acid mist;
  separating at least a portion of said acid condensate that is not suspended as acid mist from said stream of $SO_2$-depleted, $NO_x$-lean carbon dioxide gas; and
  removing said acid mist from said stream of $SO_2$-depleted, $NO_x$-lean carbon dioxide gas by passing said stream through at least one fiber bed mist eliminator to produce coalesced acid condensate and a stream of $SO_2$-depleted, $NO_x$-lean carbon dioxide gas that is at least substantially free of said acid mist, wherein said stream of $SO_2$-depleted, $NO_x$-lean carbon dioxide gas is fed to said fiber bed mist eliminator(s) at an elevated pressure; and
  recycling said coalesced acid condensate within said reactor system.

11. Apparatus for removing acid mist from a gas stream, said apparatus comprising:
  a pressurizable vessel suitable for operating at an elevated pressure, said vessel comprising an interior divided into a first zone and a second zone by a partition wall; a gas inlet to said first zone, and a gas outlet from said second zone;
  at least one fiber bed mist eliminator mounted on said partition wall providing a gas flow path from said first zone to said second zone; and
  a liquid outlet for removing coalesced acid condensate from said second zone.

12. The apparatus of claim 11, said apparatus comprising:
  a reactor system for removing at least one contaminant selected from the group consisting of $SO_2$ and $NO_x$ from carbon dioxide feed gas comprising said contaminant(s) by maintaining said feed gas at elevated pressure(s) in the presence of $O_2$ and water and, where $SO_2$ is to be removed, $NO_x$, for a period of time sufficient to convert said contaminant to at least one inorganic acid derivative thereof to produce contaminant(s)-depleted carbon dioxide gas and said inorganic acid derivative(s) as an acid condensate; and
  a separation system for separating acid condensate that is not suspended as acid mist from said stream of contaminant(s)-depleted carbon dioxide gas;
wherein said at least one pressurizable vessel is a component of said reactor system.

13. The apparatus of claim 12, comprising a conduit arrangement for recycling coalesced acid condensate from said liquid outlet within said reactor system.

14. The apparatus of claim 13, wherein said conduit arrangement comprises a pressure adjustment arrangement for adjusting the pressure of the coalesced acid condensate.

15. Apparatus comprising:
  a reactor system for removing $SO_2$ and $NO_x$ from carbon dioxide feed gas comprising $SO_2$ and $NO_x$ as contaminants by maintaining said feed gas at elevated pressure(s) in the presence of $O_2$ and water for a period of time sufficient to convert $SO_2$ to sulfuric acid and $NO_x$ to nitric acid to produce $SO_2$-depleted, $NO_x$-lean carbon dioxide gas and said sulfuric and nitric acids as an acid condensate; and
  a separation system for separating acid condensate that is not in the form of an acid mist from a stream of $SO_2$-depleted, $NO_x$-lean carbon dioxide gas,
wherein said reactor system comprises:
  a pressurizable vessel suitable for operating at an elevated pressure, said vessel comprising an interior divided into a first zone and a second zone by a partition wall; a gas inlet to said first zone, and a gas outlet from said second zone;
  at least one fiber bed mist eliminator mounted on said partition wall providing a gas flow path from said first zone to said second zone;
  a liquid outlet for removing coalesced acid condensate from said second zone; and
  a conduit arrangement for recycling coalesced acid condensate from said liquid outlet within said reactor system.

* * * * *